(12) United States Patent
Browne et al.

(10) Patent No.: US 10,592,383 B2
(45) Date of Patent: Mar. 17, 2020

(54) TECHNOLOGIES FOR MONITORING HEALTH OF A PROCESS ON A COMPUTE DEVICE

(71) Applicant: Intel Corporation, Santa Clara, CA (US)

(72) Inventors: John J. Browne, Limerick (IE); Tomasz Kantecki, Ennis (IE); Wojciech Andralojc, Drawsko Pomorskie (PL); Timothy Verrall, Pleasant Hill, CA (US); Maryam Tahhan, Limerick (IE); Eoin Walsh, Shannon (IE); Damien Power, Clare (IE); Chris MacNamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/637,706

(22) Filed: Jun. 29, 2017

(65) Prior Publication Data

US 2019/0004922 A1    Jan. 3, 2019

(51) Int. Cl.
| | | |
|---|---|---|
| G06F 11/00 | (2006.01) | |
| G06F 11/34 | (2006.01) | |
| G06F 11/30 | (2006.01) | |
| G06N 5/04 | (2006.01) | |
| G06N 20/00 | (2019.01) | |
| G06F 11/07 | (2006.01) | |

(52) U.S. Cl.
CPC ...... *G06F 11/3495* (2013.01); *G06F 11/3017* (2013.01); *G06F 11/348* (2013.01); *G06F 11/3409* (2013.01); *G06N 5/045* (2013.01); *G06F 11/0751* (2013.01); *G06F 11/0793* (2013.01); *G06F 2201/88* (2013.01); *G06N 20/00* (2019.01)

(58) Field of Classification Search
CPC ............. G06F 11/3466; G06F 11/3409; G06F 11/348; G06F 11/0754; G06F 21/552; G06F 21/566; G06F 21/567; G06F 2201/88; G06F 11/079; G06F 2201/86; G06F 2201/865; G06F 2209/508; G06F 2201/87
See application file for complete search history.

(56) References Cited

U.S. PATENT DOCUMENTS

| | | | | |
|---|---|---|---|---|
| 7,647,131 B1 * | 1/2010 | Sadowski | .......... | G05B 23/0297 700/108 |
| 7,779,238 B2 * | 8/2010 | Kosche | ............... | G06F 11/3447 712/227 |
| 8,115,659 B2 * | 2/2012 | Hurley | .................. | G06F 9/4881 341/50 |

(Continued)

*Primary Examiner* — Loan L. T. Truong
(74) *Attorney, Agent, or Firm* — Barnes & Thornburg LLP

(57) ABSTRACT

A method for monitoring health of processes includes a compute device having a performance monitoring parameter manager and an analytics engine. The compute device accesses performance monitoring parameters associated with a monitored process of the compute device. The compute device samples one or more hardware counters associated with the monitored process and applies a performance monitor filter to the sampled one or more hardware counters to generate hardware counter values. The compute device performs a process fault check on the monitored process based on the hardware counter values and the performance monitoring parameters.

19 Claims, 6 Drawing Sheets

(56) References Cited

U.S. PATENT DOCUMENTS

| | | | | |
|---|---|---|---|---|
| 8,117,487 B1* | 2/2012 | Raut | G06F 11/004 | 709/224 |
| 8,229,705 B1* | 7/2012 | Mizrahi | H04L 43/08 | 370/236.2 |
| 8,234,484 B2* | 7/2012 | Indukuru | G06F 9/3802 | 712/227 |
| 8,963,932 B1* | 2/2015 | Kiel | G06F 11/3423 | 345/440 |
| 9,071,550 B2* | 6/2015 | Tang | G06F 11/3466 | |
| 9,389,910 B2* | 7/2016 | Noel | G06F 11/3495 | |
| 9,626,229 B1* | 4/2017 | Krolak | G06F 9/52 | |
| 9,871,742 B2* | 1/2018 | Sesha | H04L 47/70 | |
| 9,996,694 B2* | 6/2018 | Sethumadhavan | G06F 21/552 | |
| 2005/0132238 A1* | 6/2005 | Nanja | G06F 1/3203 | 713/300 |
| 2008/0033696 A1* | 2/2008 | Aguaviva | G06F 11/3423 | 702/186 |
| 2008/0155386 A1* | 6/2008 | Jensen | G06F 9/5083 | 715/201 |
| 2009/0070457 A1* | 3/2009 | McKinney | G06F 9/505 | 709/224 |
| 2009/0133020 A1* | 5/2009 | Itoh | G06F 9/4881 | 718/100 |
| 2010/0077185 A1* | 3/2010 | Gopalan | G06F 9/5033 | 712/220 |
| 2011/0004575 A1* | 1/2011 | Yang | G06F 1/3203 | 706/12 |
| 2011/0107166 A1* | 5/2011 | Flautner | G06F 11/1604 | 714/746 |
| 2011/0154090 A1* | 6/2011 | Dixon | G06F 1/14 | 713/502 |
| 2011/0191776 A1* | 8/2011 | Bose | G06F 9/46 | 718/102 |
| 2011/0275356 A1* | 11/2011 | Best | H04W 36/385 | 455/414.1 |
| 2012/0096327 A1* | 4/2012 | Cai | H03M 13/3746 | 714/752 |
| 2013/0024871 A1* | 1/2013 | Gao | G06F 9/485 | 718/105 |
| 2014/0229956 A1* | 8/2014 | Fornaeus | G06F 9/5077 | 718/104 |
| 2016/0147587 A1* | 5/2016 | An | G06F 11/3644 | 714/37 |
| 2016/0328561 A1* | 11/2016 | Tamir | G06F 21/552 | |
| 2017/0017886 A1* | 1/2017 | Gao | G06N 5/04 | |
| 2017/0024660 A1* | 1/2017 | Chen | G06F 21/552 | |
| 2017/0026238 A1* | 1/2017 | Pignataro | G01R 21/133 | |
| 2017/0076198 A1* | 3/2017 | Jin | G06N 20/00 | |
| 2017/0125073 A1* | 5/2017 | Palmer | G11C 7/1036 | |
| 2017/0161612 A1* | 6/2017 | Hastings | G06N 5/022 | |
| 2017/0300814 A1* | 10/2017 | Shaked | G06N 3/0472 | |
| 2018/0137424 A1* | 5/2018 | Gabaldon Royval | G06N 5/022 | |
| 2018/0197105 A1* | 7/2018 | Luo | G06Q 10/10 | |
| 2018/0285772 A1* | 10/2018 | Gopalan | G06N 7/005 | |
| 2018/0314533 A1* | 11/2018 | Azhen | G06F 9/44505 | |
| 2018/0314936 A1* | 11/2018 | Barik | G06N 3/063 | |
| 2019/0004920 A1* | 1/2019 | Vandriessche | G06F 11/3447 | |
| 2019/0130101 A1* | 5/2019 | Chen | G06F 21/554 | |

* cited by examiner

TECHNOLOGIES FOR MONITORING HEALTH OF A PROCESS ON A COMPUTE DEVICE

BACKGROUND

Processes executing on a compute device may exhibit several different kinds of faults or undesirable behavior, such as unexpectedly ending, entering infinite loops, or being a "noisy neighbor," impacting the performance of other processes being executed on the compute device. A compute device may monitor a process to detect or address such problems in various ways. The compute device can perform process status monitoring to determine whether a certain process ID for the monitored process is valid and check a process state of the monitored process to determine whether the process state is running normally. However, the process status monitoring only provides limited failure detection capability and does not detect faults such as an infinite loop.

In order to enable monitoring for the presence of certain faults, an application being executed as a process may use instrumentation, which allows the compute device to monitor the process, such as by using heartbeat schemes. However, such monitoring methods may be complex with no standard mechanism, may be tailored solutions that change over generations of products and require heavy maintenance burden, may require that every critical process be instrumented, and may fail to detect performance impacts. Another monitoring technique that a compute device may employ is a system watchdog that monitors a process. However, the system watchdog only captures catastrophic failures and kernel lockups and results in a system reset.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
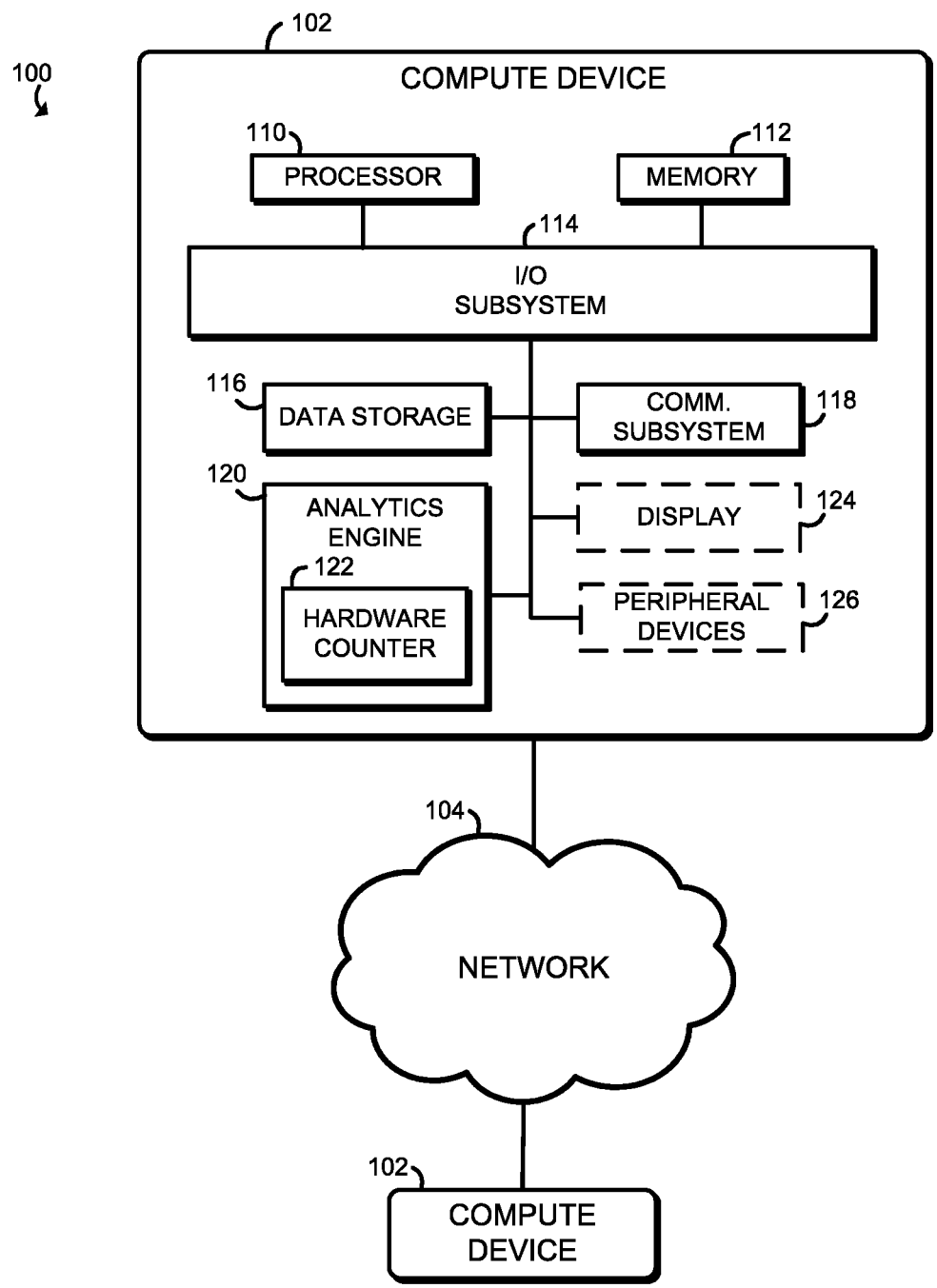
FIG. 1 is a simplified block diagram of at least one embodiment of a system for monitoring health of a process by a compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for monitoring health of a process includes a plurality of compute devices 102 and a network 104. Although FIG. 1 shows only two compute devices 102, the system 100 may include additional compute devices 102 that may be connected together via the network 104. In use, as described below, each compute device 102 may monitor a process that is executing on the respective compute device 102. An analytics engine 120 of the compute device 102 may monitor the process by recording values of hardware counters 122 associated with the monitored process. The system 100 may sample a process's utilization of central processing unit (CPU) resources through the use of the hardware counters 122 and then apply a set of rules to detect specific abnormal process conditions in the executing process. As such, the illustrative system 100 may detect the abnormal behavior without instrumentation of the application software. The system 100 may detect faults in processes that appear to be running normally to an operating system (OS). The system 100 may also detect faults in a hypervisor process and container process when they appear to be running normally to a host OS. The system 100 may detect processes that suffer a performance penalty, impacts of negative interplay between processes such as "noisy neighbor" on other processes on the CPU, and other faults. Thus, the system 100 is able to identify faults in processes that may otherwise be labelled as running normally.

The compute device 102 may be embodied as any type of computation or computer device capable of performing the functions described herein, including, without limitation, a computer, a server, a rack-mounted server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the compute device 102 illustratively includes a processor 110, a memory 112, an input/output (I/O) subsystem 114, a data storage device 116, a communication subsystem 118, an analytics engine 120, and/or other components and devices commonly found in a server computer or similar compute device. Of course, the compute device 102 may include other or additional components, such as those commonly found in a server computer (e.g., various input/output devices), in other embodiments. In some embodiments, the compute device 102 may include a display 124 and peripheral devices 126. Additionally, in some embodiments, one or more of the illustrative components may be incorporated in, or otherwise form a portion of, another component. For example, the memory 112, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. The memory 112 may be embodied as any type of volatile or non-volatile memory or data storage capable of performing the functions described herein. In operation, the memory 112 may store various data and software used during operation of the compute device 102 such operating systems, applications, programs, libraries, and drivers. The memory 112 is communicatively coupled to the processor 110 via the I/O subsystem 114, which may be embodied as circuitry and/or components to facilitate input/output operations with the processor 110, the memory 112, and other components of the compute device 102. For example, the I/O subsystem 114 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 112, and other components of the compute device 102, on a single integrated circuit chip.

The data storage device 116 may be embodied as any type of device or devices configured for short-term or long-term storage of data such as, for example, memory devices and circuits, memory cards, hard disk drives, solid-state drives, non-volatile flash memory, or other data storage devices. The compute device 102 may also include a communications subsystem 118, which may be embodied as any communication circuit, device, or collection thereof, capable of enabling communications between the compute device 102 and other remote devices over the network 104. For example, the communications subsystem 118 may be embodied as or otherwise include a network interface controller (NIC) for sending and/or receiving network data with remote devices. The communications subsystem 118 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown in FIG. 1, the compute device 102 includes an analytics engine 120. The analytics engine 120 may be embodied as any controller, functional block, digital logic, or other component capable of performing the functions described herein. In the embodiment shown, the analytics engine 120 includes one or more hardware counters 122. In other embodiments, the hardware counter 122 may be separate from the analytics engine 120. Additionally, although illustrated in FIG. 1 as discrete components separate from the processor 110 and/or the I/O subsystem 114, it should be understood that in some embodiments one or more of the analytics engine 120, the hardware counter 122, the processor 110, the I/O subsystem 114, and/or the memory 112 may be incorporated in the same package and/or in the same computer chip, such as in the same SoC. For example, the analytics engine 120 and/or the hardware counters 122 may form a portion of the processor 110 in some embodiments.

Each of the one or more hardware counters 122 is configured to monitor an aspect of the current or recent performance of the compute device 102 in execution of the current process, such as a hardware counter 122 indicating each of a current or recent memory bandwidth, a current or recent cache utilization, a current or recent number of instructions per cycle (IPC), a recent number of cache misses, a recent number of cache accesses, and various indicators of uncore activity. Uncore activity refers to any activity or function carried out by the processor 110 that is not performed by a core of the processor 1120. Uncore activity may be performed by a system agent and includes activity such as a QuickPath Interconnect, a level 3 (L3) cache usage, a snoop agent pipeline, a memory controller, and a Thunderbolt controller. In some embodiments, one or more of the hardware counters 122 may be referred to, characterized as, or embodied as Resource Director Technology (RDT) counters (which may record information relating to memory bandwidth and cache utilization) and/or Performance Monitor Unit (PMU) counters (which may record information related to instructions per cycle, cache misses, cache accesses, and uncore activity). In the illustrative embodiment, each hardware counter 122 provides an indication of a property associated with the currently-executing process which may be independent of other processes that may be executed on the processor 110 at different times. It should be appreciated that, while some embodiments of a hardware counter 122 may be embodied as counters (i.e., a hardware counter 122 may count an integer number of occurrences of some event or value), other embodiments of a hardware counter 122 may store an indication of an aspect of performance of the compute device 102 in a manner that is not like a traditional counter, such as a status indicator, a fraction, an index in a look-up table, etc. It should further be appreciated that, in the illustrative embodiment, each of the hardware counters 122 does not interfere with or impede the functionality of the processor 110 executing a process but merely monitors the status of an aspect of the process.

The compute device 102 may further include one or more peripheral devices 126. The peripheral devices 126 may include any number of additional input/output devices, interface devices, and/or other peripheral devices. For example, in some embodiments, the peripheral devices 126 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

As shown in FIG. 1, the system 100 includes a network 104. The network 104 may be embodied as any type of network capable of facilitating communications between the compute devices 102 and/or other remote devices. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications thereacross.

Figure 2:
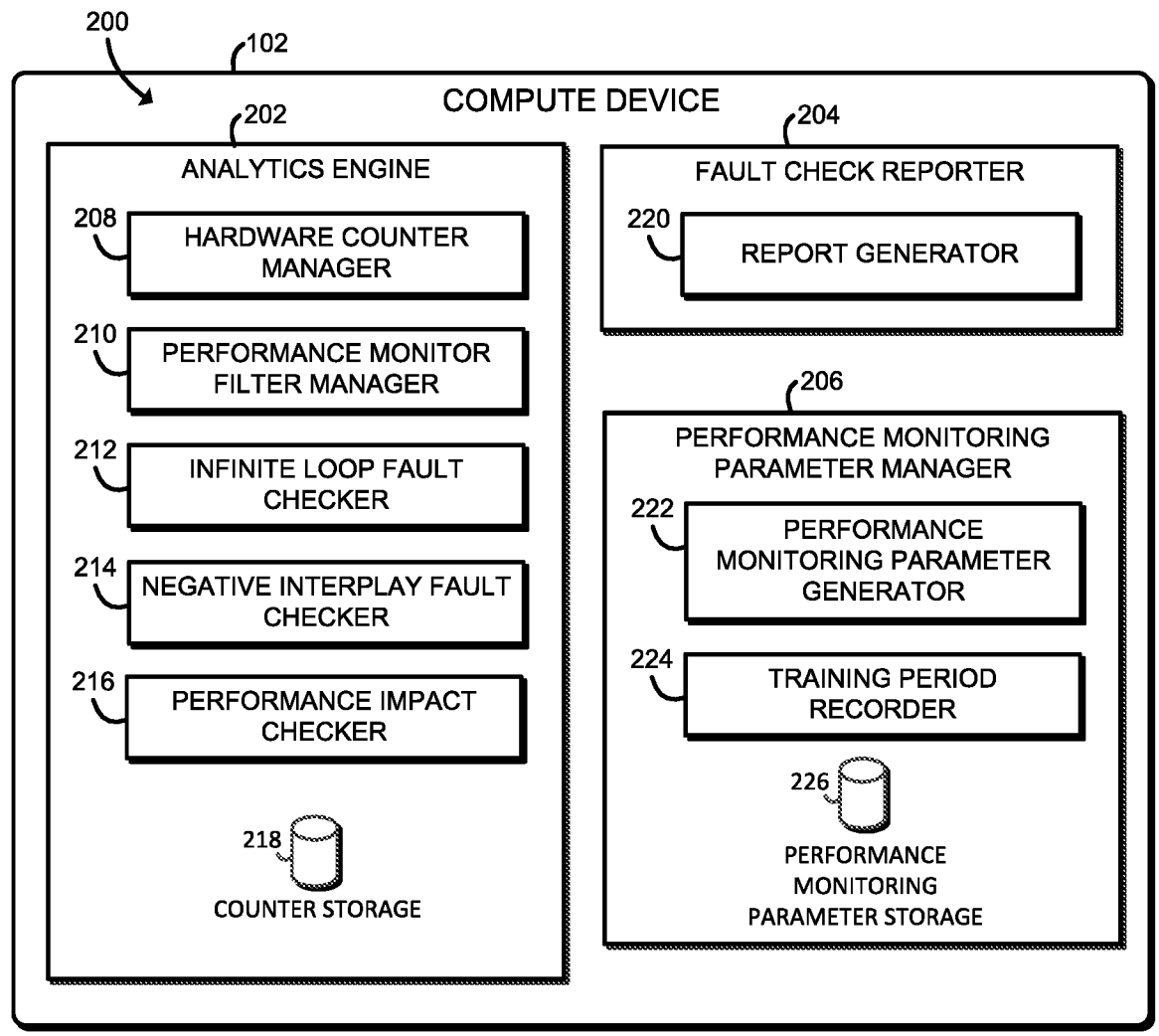
FIG. 2 is a simplified block diagram of at least one embodiment of an environment of a compute device of FIG. 1.

Referring now to FIG. 2, in an illustrative embodiment, the compute device 102 may establish an environment 200 during operation. The illustrative embodiment 200 includes analytics engine 202, a fault check reporter 204, and a performance monitoring parameter manager 206. The various components of the environment 200 may be embodied as hardware, firmware, software, or a combination thereof. For example, the various modules, logic, and other components of the environment 200 may form a portion of, or otherwise be established by, the processor 110 or other hardware components of the compute device 102 such as the memory 112. As such, in some embodiments, one or more of the components of the environment 200 may be embodied as circuitry or collection of electrical devices (e.g., an analytics engine circuit 202, a fault check reporter circuit 204, a performance monitoring parameter manager circuit 206, etc.). It should be appreciated that, in such embodiments, one or more of the circuit (e.g., the analytics engine circuit 202, the fault check reporter circuit 204, the performance monitoring parameter manager 206 circuit, etc.) may form a portion of the processor 110, the memory 112, the I/O subsystem 114, and/or other components of the compute device 102. Additionally, in some embodiments, one or more of the illustrative components may form a portion of another component and/or one or more of the illustrative components may be independent of one another. Also, although illustrated as being established by a single compute device 102, in some embodiments the environment 200 may be established by several compute devices 102 in communication over the network 104. Further, in some embodiments, one or more of the components of the environment 200 may be embodied as virtualized hardware components or emulated architecture, which may be established and maintained by the processor 110 or other components of the compute device 102.

The analytics engine 202 is configured to perform analytical processing to monitor the health of a process executing on the compute device 102. The analytics engine 202 may be embodied as a cloud service or user process on the compute device 102. In the illustrative embodiment, the analytics engine 202 includes a hardware counter manager 208, a performance monitor filter manager 210, an infinite loop fault checker 212, a negative interplay fault checker 214, a performance impact checker 216, and a counter storage 218. It should be appreciated that any of the components of the analytics engine 202 may be combined to simplify the design of the analytics engine 202. For example, the fault checkers 212, 214, and 216 may be combined to be one fault checker for all process faults. In another embodiment, the hardware counter manager 208 may be separated out into an individual Resource Director Technology (RDT) counter manager and an individual Performance Monitor Unit (PMU) counter manager.

The hardware counter manager 208 may manage and maintain the values of the hardware counters 122 for the monitored processes gathered from the compute device 102. As discussed above, the hardware counters 122 may be embodied as RDT counters, PMU counters, and/or any other hardware counters to monitor a process. The hardware counters 122 may provide information on a current or recent memory bandwidth, a current or recent cache utilization, a current or recent number of instructions per cycle (IPC), a recent number of cache misses, a recent number of cache accesses, and information related to various uncore activity, such as information relating to a QuickPath Interconnect, a level 3 (L3) cache usage, a snoop agent pipeline, a memory controller, and/or a Thunderbolt controller. The hardware counter manager 208 may sample hardware counters 122 associated with a monitored process and record the data into the counter storage 218. For example, the hardware counter manager 208 may sample the hardware counters 122 by taking snapshots of the RDT counters, PMU counters, and/or other hardware counters associated with the monitored process. Accordingly, the hardware counter manager 208 may generate sampled data for the hardware counters 122. The hardware counter manager 208 may access the hardware counter values stored in the counter storage 218 and process the hardware counter values in order to determine the health of the monitored process associated with the values of the hardware counters 122. The counter storage 218 may be embodied as a part of the data storage 116 or a separate piece of persistent storage. The hardware counter manager 208 may retrieve the values of several hardware counters 122 for a monitored process to determine a process behavior. For example, the hardware counter manager 208 may retrieve the values of the RDT counters for a monitored process in order to determine the memory bandwidth for the monitored process.

The performance monitor filter manager 210 may manage and maintain a performance monitor filter that may be applied to the values of the monitored hardware counters 122. The performance monitor filter may be used to generate a more reliable dataset from the sampled data received from the hardware counter manager 208. In some embodiments, the performance monitor filter may be embodied as an exponentially weighted moving average (EWMA) filter. Additionally or alternatively, the performance monitoring filter may be embodied as a window filter, a rectangle filter, a ramp filter, moving average convergence divergence values, or any other suitable filter or other statistical analysis technique. The performance monitor filter may make it easier to track trends in the values of the sampled hardware counters 122. The performance monitor filter manager 210 may generate filtered sampled data from applying the performance monitor filter on the values of the sampled hardware counters 122. In some embodiments, the performance monitor filter manager 210 may filter the sampled data in varying time windows or with varying time characteristics. For example, the performance monitor filter manager 210 may apply the filter over the last, e.g., 1, 5, 10, 30, or 60 seconds of sampled data or may apply a filter such as an EWMA filter with a time constant of, e.g., 1, 5, 10, 30, or 60 seconds.

The infinite loop fault checker 212 may provide a process fault check to determine whether the monitored process is performing an infinite loop. For example, the monitored process may appear to be running normally to an operating system (OS) but may be stuck in an infinite loop. The infinite loop fault checker 212 may communicate with the hardware counter manager 208 and the performance monitor filter manager 210 to receive the generated filtered sampled data to perform the process fault check. The infinite loop fault checker 212 may also communicate with the performance monitoring parameter manager 206 to receive one or more performance monitoring parameters associated with the monitored process. In the illustrative embodiment, the infinite loop fault checker 212 may determine whether the filtered cache misses/accesses ratio of the monitored process is out of range of the performance monitoring parameters associated with the monitored process and determine whether the filtered uncore activity of the monitored process is out of range of the performance monitoring parameters associated with the monitored process. The illustrative infinite loop fault checker 212 may indicate a detected process fault if the infinite loop fault checker 212 determines that both conditions are true. Additionally or alternatively, the infinite loop fault checker 212 may indicate a detected process fault if only one or the other condition is true, or the infinite loop fault checker 212 may check conditions related to other system performance parameters different from the cache misses/accesses ratio and the uncore activity and indicate a detected process fault based on those conditions. The infinite loop fault checker 212 may also indicate the detected process fault as an infinite loop fault.

The negative interplay fault checker 214 may provide a process fault check to determine whether the monitored process is sitting on or near a processor core that is consuming a lot of resources and affecting the monitored process. For example, the monitored process may be one of several virtualized network functions (VNFs) running on the same processor, and one or more of the other VNFs may impact the performance of the monitored process due to a negative interplay between the VNFs. In other embodiments, the negative interplay fault checker 214 may determine whether the monitored process itself is affecting other processes by consuming a lot of resources. The negative interplay fault checker 214 may communicate with the hardware counter manager 208 and the performance monitor filter manager 210 to receive the generated filtered sampled data to perform the process fault check. The negative interplay fault checker 214 may also communicate with the performance monitoring parameter manager 206 to receive the one or more performance monitoring parameters associated with the monitored process. In the illustrative embodiment, negative interplay fault checker 214 may determine whether the filtered memory bandwidth of the monitored process increases, whether the filtered cache misses increases, whether the filtered cache accesses increases, and whether the filtered cache utilization decreases based on the performance monitoring parameters of the monitored process. The illustrative negative interplay fault checker 214 may indicate a detected process fault if the negative interplay fault checker 214 determines that all of the conditions are true. Additionally or alternatively, the negative interplay fault checker 214 may indicate a detected process fault if only one or some of the conditions are true, or the negative interplay fault checker 212 may check conditions related to other system performance parameters different from the cache misses, the cache accesses, and the cache utilization and indicate a detected process fault based on those conditions. The negative interplay fault checker 214 may also indicate the detected process fault as a negative interplay fault. It should be appreciated that, in some embodiments, the negative interplay fault checker 214 may determine that a negative interplay fault exists, but may not necessarily identify the process or processes which are causing the fault.

The performance impact checker 216 may provide a process fault check to determine whether the monitored process is executing more slowly than expected. The performance impact checker 216 may communicate with the hardware counter manager 208 and the performance monitor filter manager 210 to receive the generated filtered sampled data to perform the process fault check. The performance impact checker 216 may also communicate with the performance monitoring parameter manager 206 to receive one or more performance monitoring parameters associated with the monitored process. In the illustrative embodiment, the performance impact checker 216 may determine whether filtered instructions per cycle (IPC) of the monitored process are below a range of the performance monitoring parameters associated with the monitored process. The illustrative performance impact checker 216 may indicate a detected process fault if the performance impact checker 216 determines that the condition is true. Additionally or alternatively, the performance impact checker 214 may check conditions related to other system performance parameters different from the IPC and indicate a detected process fault based on those conditions. The performance impact checker 216 may also indicate the detected process fault as a performance impacted fault.

The fault check reporter 204 is configured to perform a response in response to detection of a process fault for a monitored process of the compute device 102. The fault check reporter 204 may be embodied as a cloud service, a user process on the compute device 102, a management server, and/or the like. In the illustrative embodiment, the fault check reporter 204 includes a report generator 220 to generate a report via an interrupt detailing the process fault for a monitored process of the compute device 102. The fault check reporter 204 may communicate with the process fault checkers 212, 214, and 216 to determine the number of process faults detected by the analytics engine 202. In some embodiments, the fault check reporter 204 may not perform an action until the fault check reporter 204 determines that the number of process faults exceed a threshold amount of process faults over a certain period of time. The fault check reporter 204 may perform a local corrective action to address the detected process faults. For example, the fault check reporter 204 may kill the monitored process and restart the monitored process. The fault check reporter 204 may also be configured to communicate to another compute device 102 embodied as an analytics system to send data on detected process faults for the analytics system to make a decision on how to address the detected process faults. The fault check reporter 204 may generate the report through the report generator 220 to notify a user of the compute device 102 that there is a detected process fault to receive instructions from the user. In some embodiments, the report generator 220 may notify the user by using the display 124 to show the generated report. In other embodiments, the report generator 220 may also notify the user through a speaker of the peripheral devices 128.

The performance monitoring parameter manager 206 is configured to manage performance monitoring parameters usable by the analytics engine 202 to process values of the hardware counters 122 with the process fault checkers 212, 214, 216. The performance monitoring parameters may be embodied as any parameter usable to process values of the hardware counters 122 in order to determine an aspect of the performance of a process executing on the compute device

102. For example, a performance monitoring parameter may be embodied as minimum values of hardware counters 122, maximum values of hardware counters 122, average values of hardware counter 122, minimum rates of increase of values of hardware counters 122, maximum rates of increase of value of hardware counters 122, parameters for machine-learning-based algorithms which can process values of hardware counter 122, etc. It should be appreciated that the performance monitoring parameters may be embodied as parameters usable to process either filtered values of the hardware counters 122 or the unfiltered values of the hardware counters 122. The performance monitoring parameter manager 206 may be embodied as a cloud service or user process on the compute device 102. In the illustrative embodiment, the performance monitoring parameter manager 206 includes a performance monitoring parameter generator 222, a training period recorder 224, and a performance monitoring parameter storage 226. It should be appreciated that any of the components of the performance monitoring parameter manager 206 may be combined to simplify the design of the performance monitoring parameter manager 206.

The performance monitoring parameter generator 222 may automatically determine values for the performance monitoring parameters for a monitored process. The performance monitoring parameter generator 222 may be configured to interact with the training period recorder 224 in order to execute the monitored process for a time window in order to measure the performance monitoring parameters for the monitored process. In some embodiments, the monitored characteristic may include a memory bandwidth, cache utilization, an IPC, cache misses, cache accesses, uncore activity counters, and/or other monitored characteristics. These monitored characteristics may be determined from the hardware counters 122 as described above. After generating the performance monitoring parameters, the performance monitoring parameter manager 206 may store the performance monitoring parameters in a performance monitoring parameter storage 226. Similar to the counter storage 218, the performance monitoring parameter storage may be embodied as a part of the data storage 116 or a separate piece of persistent storage. In other embodiments, the performance monitoring parameter generator 222 may set the performance monitoring parameters. For example, a user of the compute device 102 may set the performance monitoring parameters or retrieve the performance monitoring parameters from another compute device 102 embodied as a management system. In other embodiments, the performance monitoring parameter generator 222 may determine the performance monitoring parameters by training a machine learning algorithm based on the values of the hardware counters 122 associated with a monitored process during a training period.

Figure 3:
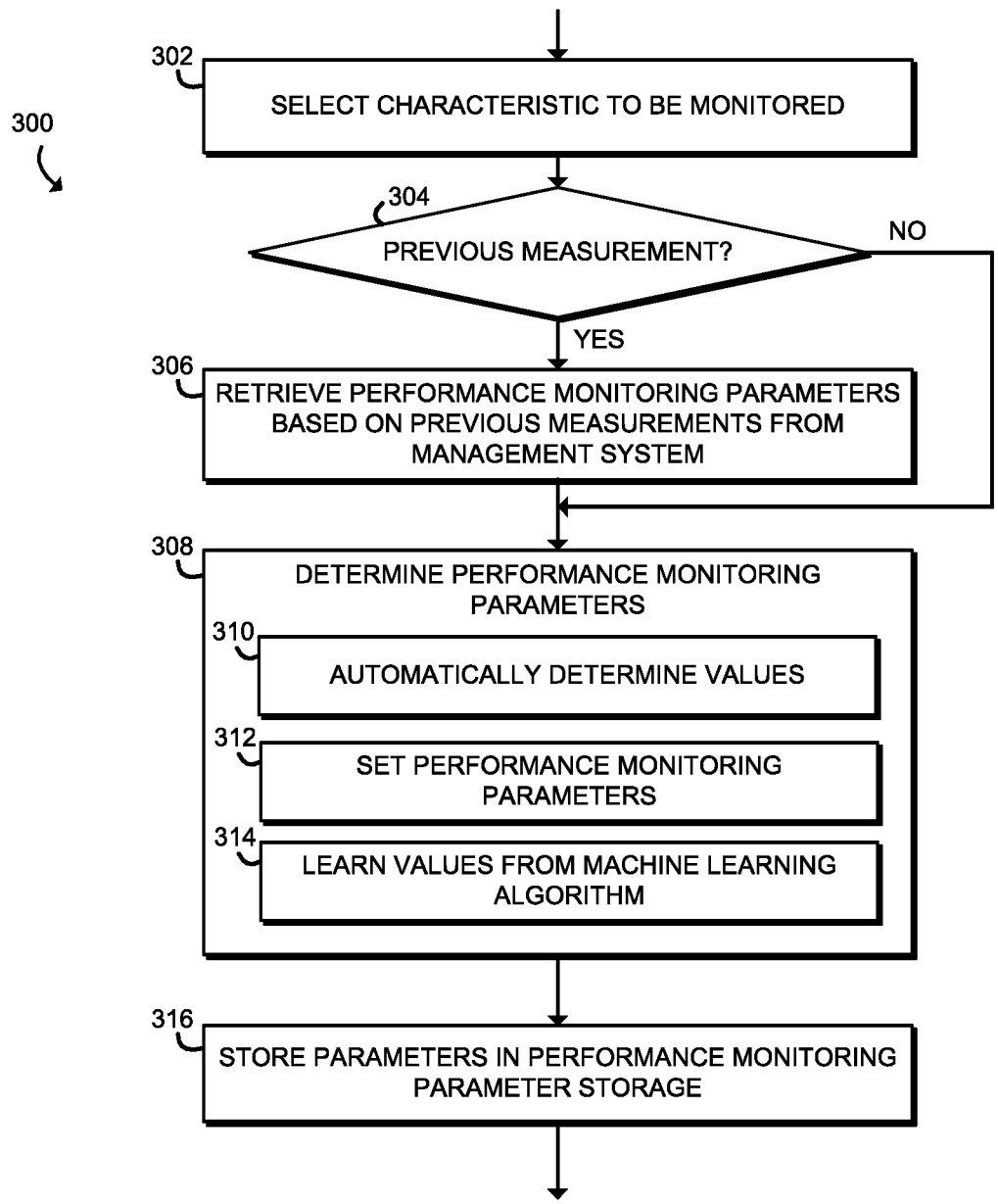
FIG. 3 is a simplified flow diagram of at least one embodiment of a method for determining performance monitoring parameters for monitoring health of a process that may be executed by the compute device of FIGS. 1 and 2.

Referring now to FIG. 3, in use, the compute device 102 may execute a method 300 for obtaining performance monitoring parameters of a monitored process. It should be appreciated that, in some embodiments, the operations of the method 300 may be performed by one or more components of the environment 200 of the compute device 102 as shown in FIG. 2. The method begins in block 302, in which the compute device 102 selects a characteristic of a monitored process to be monitored. For example, the compute device 102 may select at least one of a memory bandwidth, cache utilization, an IPC, cache misses, cache accesses, uncore activity counters, and/or other monitored characteristics. In block 304, the compute device 102 determines whether there were previous measurements for the monitored characteristic of the monitored process. If the compute device 102 determines that there were no previous measurements, the method 300 branches ahead to block 308 to continue obtaining the performance monitoring parameters of the monitored process. If the compute device 102 determines there were previous measurements, then the method 300 advances to block 306.

In block 306, the compute device 102 retrieves performance monitoring parameters based on previous measurements from the compute device 102 or another compute device 102 that is embodied as a management system. The compute device 102 may communicate with the management system to identify the monitored characteristic of the monitored process in order to retrieve the performance monitoring parameters for that monitored characteristic. In other embodiments, the compute device 102 may retrieve any number of performance monitoring parameters for the monitored process.

In some embodiments, in block 308, the compute device 102 may determine the performance monitoring parameters in the case that there were no previous measurements for a monitored characteristic of the monitored process or if there are more performance monitoring parameters required. In some embodiments, in block 310, the compute device 102 may determine the values of the performance monitoring parameters automatically by utilizing a training period for the monitored process. For example, a training period for the monitored process may be set to measure the monitored process to determine the performance monitoring parameters of the monitored characteristic of the monitored process based on a typical or an acceptable range of values of one or more hardware counters 122. In some embodiments, the compute device 102 may determine performance monitoring parameters for any number of the monitored characteristics of the monitored process. In some embodiments, in block 312, the compute device 102 may set the performance monitoring parameters for the monitored characteristic of the monitored process. For example, an administrator may set the performance monitoring parameters for the monitored characteristic of the monitored process. In other embodiments, the compute device 102 may set any number of the performance monitoring parameters of the monitored process. In some embodiments, in block 314, the compute device 102 learns the values of the performance monitoring parameters from a machine learning algorithm based on the values of the hardware counters 122 associated with a monitored process during a training period.

In block 316, the compute device 102 stores the performance monitoring parameters in a performance monitoring parameter storage 226 to be accessed later. In some embodiments, the compute device 102 may further use the performance monitoring parameter storage 226 to retrieve the performance monitoring parameters of the monitored process. The performance monitoring parameters may be accessed by different parts of the compute device to perform an analysis on whether there is a process fault. After completion of the method 300, the compute device 102 may perform the method 300 for other monitored characteristics of the monitored process until any number of performance monitoring parameters is determined for the monitored process. In other embodiments, the compute device 102 may perform the method 300 for other monitored processes after completion of the method 300. In other embodiments, the compute device may perform the method 300 for any number of monitored processes simultaneously.

Figure 4:
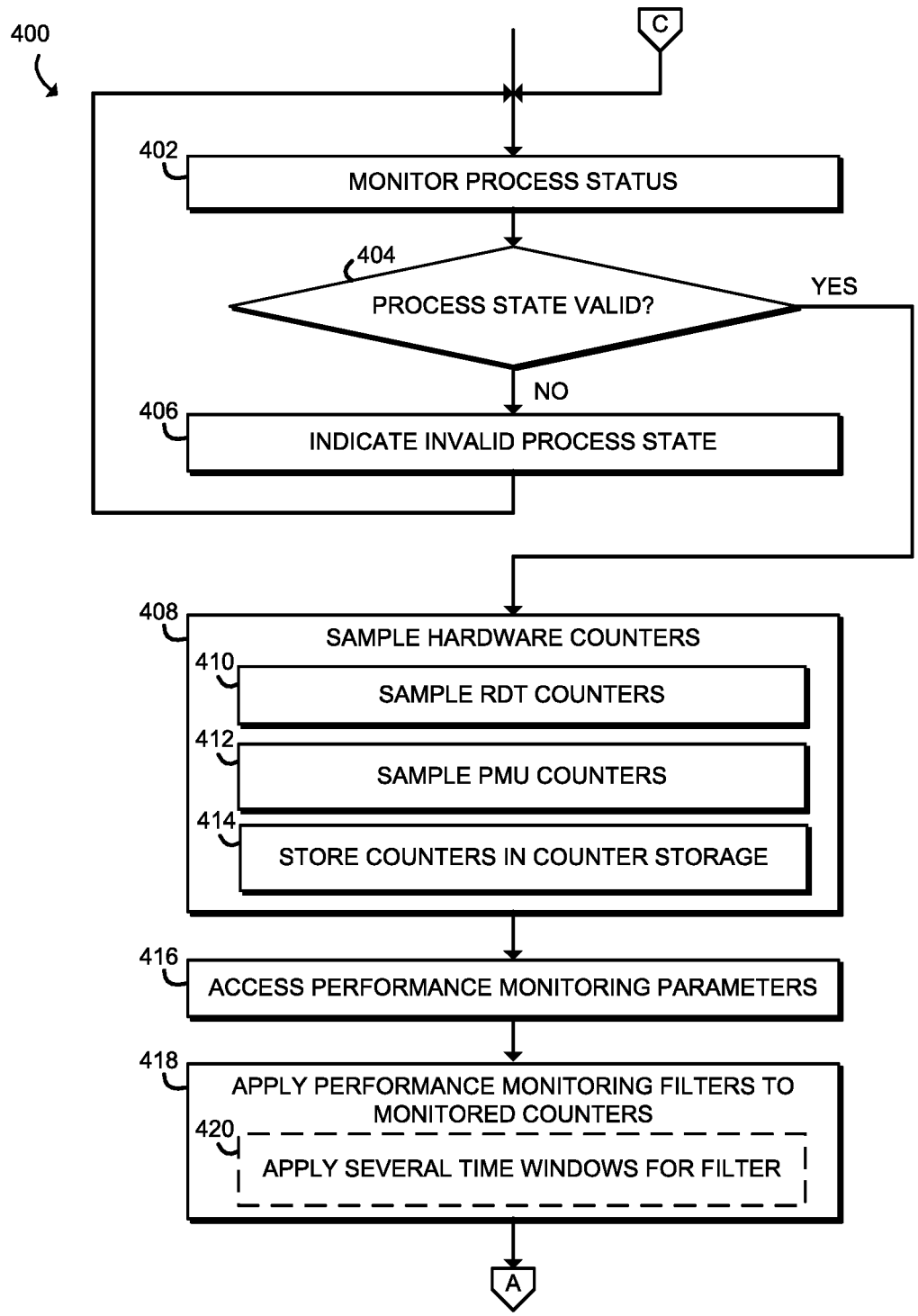
FIGS. 4, 5, and 6 are a simplified flow diagram of at least one embodiment of a method for monitoring health of a process that may be executed by the compute device of FIGS. 1 and 2.
Figure 5:
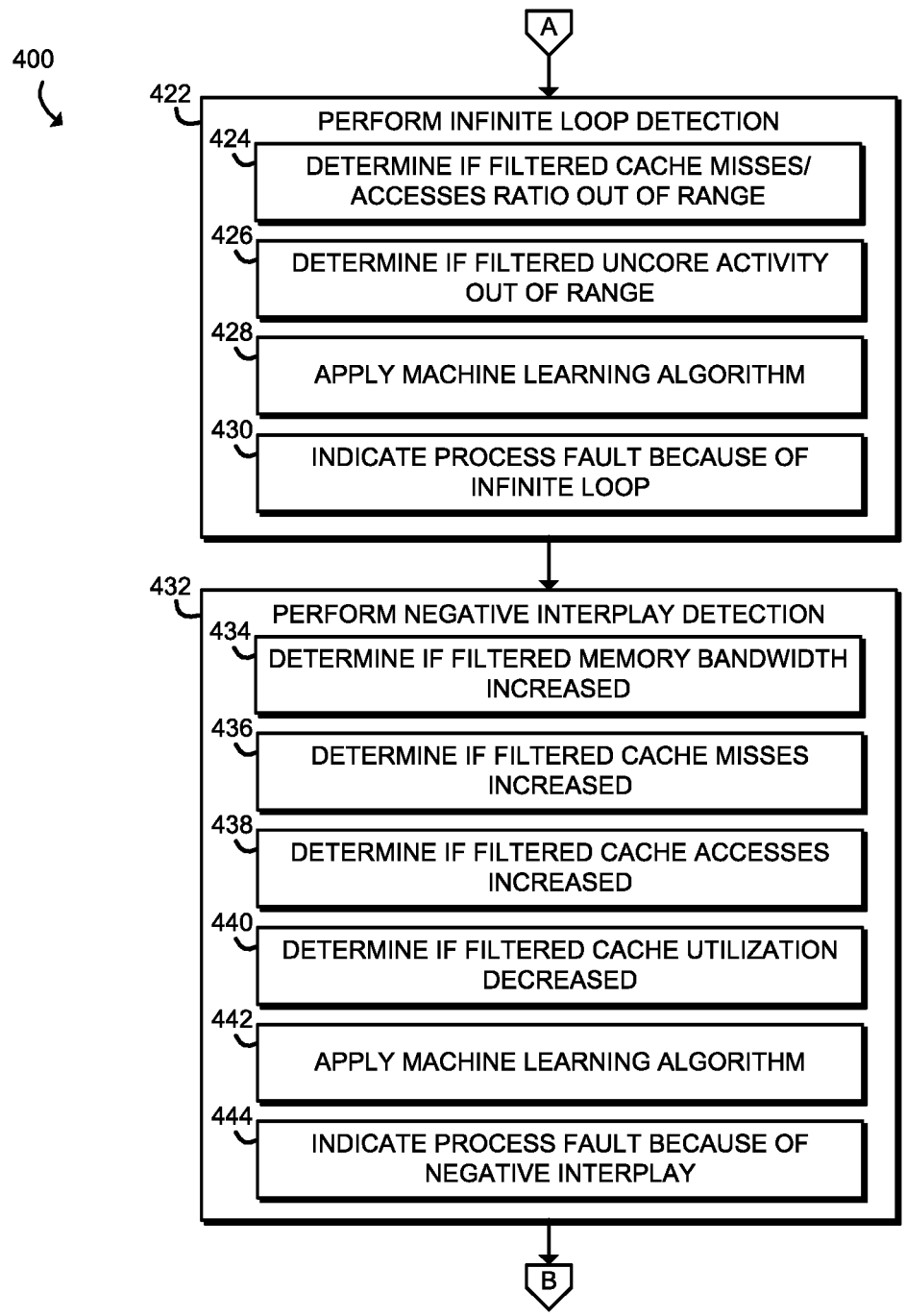
Figure 6:
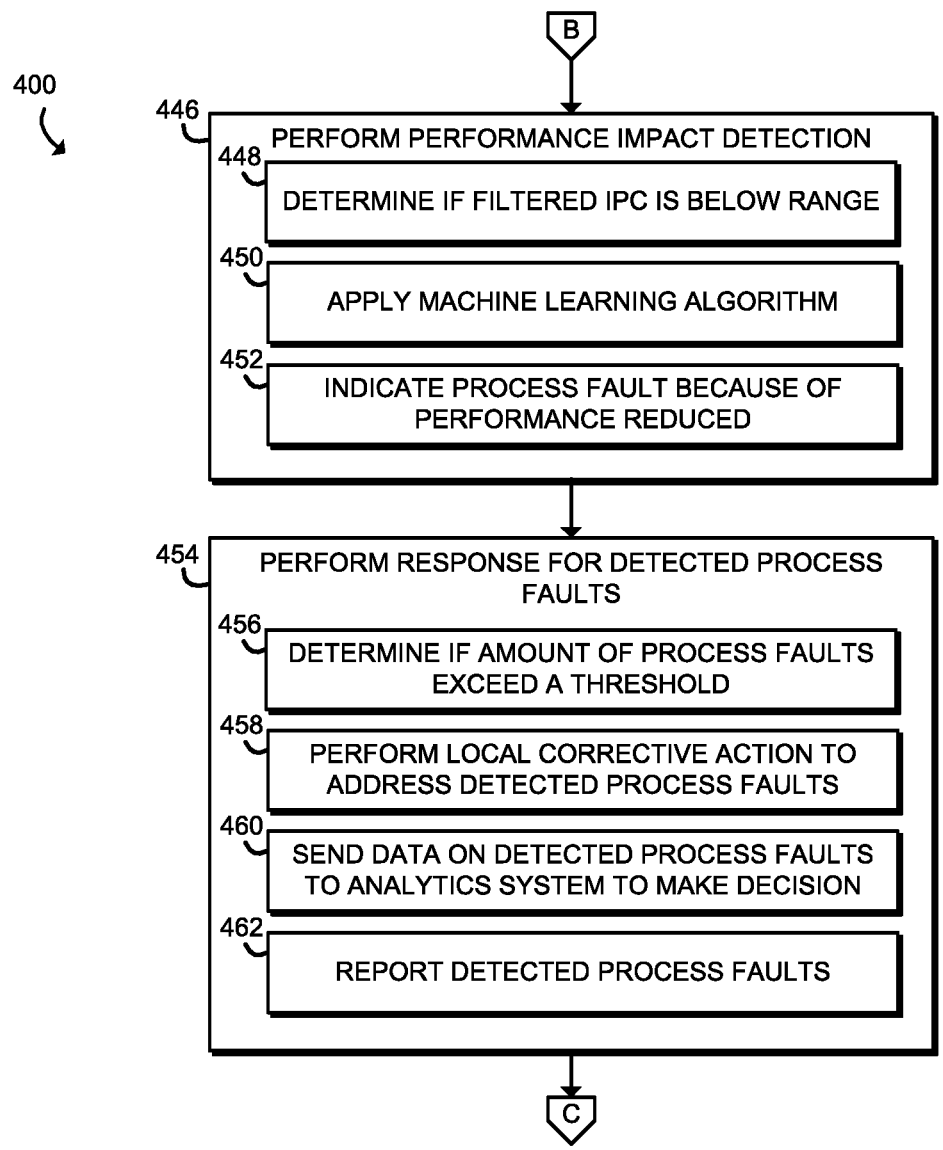

Referring now to FIGS. 4, 5, and 6, in use, the compute device 102 may execute a method 400 for monitoring the health of an operational process or monitored process. It should be appreciated that, in some embodiments, the operations of the method 400 may be performed by one or more components of the environment 200 of the compute device 102 as shown in FIG. 2. The method 400 begins in block 402, in which the compute device 102 monitors a process status of a monitored process. The compute device 102 may read an OS process state using a process ID to determine whether the process ID is valid to determine whether the process state is valid. In some embodiments, the compute device 102 may determine whether the process state is normal. For example, the process state is running or sleeping. Instances for when the process state may not be normal are when the process state indicates the process is stopped, a tracing stop, zombie, or dead. In some embodiments, the compute device 102 may determine whether the process CPU and resource utilization are in an expected range to determine whether the process state is valid.

In block 404, if the process state is valid, the method 400 branches ahead to block 408 to continue monitoring the health of the monitored process. If the process state is not valid, the compute device 102 advances to block 406.

In block 406, the compute device 102 indicates there is an invalid process state. In some embodiments, the compute device 102 may generate a report indicating the invalid process state. The report may notify the user of the compute device 102 that there is an invalid process state. In other embodiments, the compute device 102 may perform similar actions when the invalid process state is detected to when a process fault is detected as described below. After block 406, the method 400 loops back around to block 402 to monitor a process status. The process may be the same process or another process that requires monitoring.

Referring back to block 404, if the process state is valid, the method proceeds to block 408, in which the compute device 102 samples hardware counters 122 associated with the monitored process as described above, which may provide information on a current or recent memory bandwidth, a current or recent cache utilization, a current or recent number of instructions per cycle (IPC), a recent number of cache misses, a recent number of cache accesses, and information related to various uncore activity, such as information relating to a QuickPath Interconnect, a level 3 (L3) cache usage, a snoop agent pipeline, a memory controller, and/or a Thunderbolt controller. In block 410, the compute device 102 samples RDT counters of the monitored process. For example, the compute device 102 may take snapshots of the RDT counters as described above. In block 412 the compute device 102 samples the PMU counters of the monitored process. For example, the compute device 102 may take snapshots of the PMU counters as described above. In block 414, the compute device 102 stores the sampled counters in a counter storage 218 to be accessed later as described above.

In block 416, the compute device 102 accesses performance monitoring parameters. In some embodiments, the access of performance monitoring parameters may initiate method 300 on the compute device 102 to obtain the performance monitoring parameters for the monitored process. In some embodiments, the compute device 102 accesses the performance monitoring parameters from a performance monitoring parameter storage 226 as described above.

In block 418, the compute device 102 applies a performance monitoring filter to each monitored counter. The compute device 102 may apply a performance monitoring filter to the sampled data of hardware counters in order to generate filtered sampled data as described above. In the illustrative embodiment, the performance monitoring filter may be embodied as an exponentially weighted moving average (EWMA) filter. Additionally or alternatively, the performance monitoring filter may be embodied as a window filter, a rectangle filter, a ramp filter, moving average convergence divergence values, or any other suitable filter or other statistical analysis technique. In some embodiments, in block 420, the compute device 102 applies several time windows for the performance monitoring filter. For example, the performance monitor filter manager 210 may apply the filter over the last, e.g., 1, 5, 10, 30, or 60 seconds of sampled data or may apply a filter such as an EWMA filter with a time constant of, e.g., 1, 5, 10, 30, or 60 seconds. It should be appreciated that, in some embodiments, the unfiltered values of the hardware counters 122 may be used directly to monitor the performance of the compute device 102.

In block 422, the compute device 102 performs an infinite loop detection for the monitored process. The compute device 102 may perform the infinite loop detection in response to an indication that one of the monitored characteristics for the infinite loop detection is detected outside the range of the performance monitoring parameters for the monitored process or the compute device 102 may apply the infinite loop detection periodically, continuously, or continually for some or all monitored processes. In block 424, the compute device 102 determines whether filtered cache misses/accesses ratio of the monitored process is out of the range established by the performance monitoring parameters. In block 426, the compute device 102 determines whether filtered uncore activity of the monitored process is out of range of the performance monitoring parameters for the monitored characteristic of the monitored process. In block 428, the compute device 102 applies a machine learning algorithm using the filtered values of the monitored hardware counters 122 to determine whether there is an infinite loop. In block 430, the compute device 102 indicates a process fault if the compute device 102 determines that the filtered cache misses/accesses ratio is out of range of the performance monitoring parameters, that the filtered uncore activity is out of range of the performance monitoring parameters, and/or that the machine learning algorithm indicates that there is an infinite loop. The compute device 102 may indicate the process fault as an infinite loop process fault.

In block 432, the compute device 102 performs a negative interplay detection for the monitored process. The compute device 102 may perform the negative interplay detection in response to an indication that one of monitored characteristics for the negative interplay detection is detected outside the range of the performance monitoring parameters for the monitored process or the compute device 102 may apply the negative interplay detection periodically, continuously, or continually for some or all monitored processes. In block 434, the compute device 102 determines whether filtered memory bandwidth of the monitored process exceed a threshold value of a performance monitoring parameter and/or whether the rate of change of the filtered memory bandwidth of the monitored exceeded a threshold value of a performance monitoring parameter. In block 436, the compute device 102 determines whether filtered cache misses of the monitored process exceed a threshold value of a performance monitoring parameter and/or whether the rate of change of the filtered cache misses of the monitored exceeded a threshold value of a performance monitoring parameter. In block 438, the compute device 102 determines whether filtered cache accesses of the monitored process exceed a threshold value of a performance monitoring parameter and/or whether the rate of change of the filtered cache accesses of the monitored exceeded a threshold value of a performance monitoring parameter. In block 440, the compute device 102 determines whether filtered cache utilization of the monitored process was below a threshold value of a performance monitoring parameter and/or whether the rate of change of the filtered cache utilization of the monitored was above or below a threshold value of a performance monitoring parameter. In block 442, the compute device 102 applies a machine learning algorithm using the filtered values of the monitored hardware counters 122 to determine whether there is a negative interplay effect. In block 444, the compute device 102 indicates a process fault if the compute device 102 determines that the filtered memory bandwidth or rate of change of the filtered memory bandwidth exceeded a threshold value of a performance monitoring parameter, that the filtered cache misses or rate of change of the filtered cache misses exceeded a threshold of a performance monitoring parameter, that the filtered cache accesses or rate of change of the filtered cache accesses exceeded a threshold value of a performance monitoring parameter, that the filtered cache utilization or rate of change of the filtered cache utilization was above or below a threshold value of a performance monitoring parameter, and/or that the machine learning algorithm indicates that there is a negative interplay effect. The compute device 102 may indicate the process fault as a negative interplay detection.

In block 446, the compute device 102, performs a performance impact detection for the monitored process. The compute device 102 may perform the performance impact detection in response to an indication that the monitored characteristic for the performance impact detection is detected outside the range of the performance monitoring parameters for the monitored process or the compute device 102 may apply the performance impact detection periodically, continuously, or continually for some or all monitored processes. In block 448, the compute device 102 determines whether filtered IPC of the monitored process is below a threshold value of a performance monitoring parameter. In block 450, the compute device 102 applies a machine learning algorithm using the filtered values of the monitored hardware counters 122 to determine whether there is a performance impact detected. In block 452, the compute device 102 indicates a process fault if the compute device 102 determines that the filtered IPC is below the range of the performance monitoring parameters and/or that the machine learning algorithm indicates that there is a performance impact detected. The compute device 102 may indicate the process fault as a performance impact fault.

In block 454, the compute device 102 performs a response for the detected process fault. In some embodiments, the compute device 102 may perform the response after completion of all of the process fault detections if a process fault is detected. In some embodiments, the compute device 102 may perform the response after completion of each process fault detection if a process fault is detected. In block 456, the compute device 102 determines whether a number of process faults exceeds a threshold. In some embodiments, the compute device 102 may not perform a response until a number of process faults exceeds a threshold. For example, the number of process faults may need to exceed 3 process faults. In other embodiments, the threshold to exceed may be any number of process faults.

In block 458, the compute device 102 performs a local corrective action to address the detected process faults as described above. In some embodiments, the compute device 102 may perform the local corrective action simultaneously for any number of detected process faults. In other embodiments, the compute device 102 may perform the local corrective action for each individual detected process fault. In block 460, the compute device 102 sends data on the detected process faults to another compute device 102 embodied as an analytics system to make a decision on how to address the detected process fault. For example, the analytics system may send a response to the compute device 102 to kill and restart the monitored process to address the detected process fault. In some embodiments, the analytics system may log data on all received process faults to identify how to address the received process fault data. Accordingly, a plurality of compute devices 102 may send data regarding process faults and the analytics system may compile the data to determine a successful way to address the detected process fault. In block 462, the compute device 102 may report the detected process faults to a user of the compute device as described above.

It should be appreciated that, in some embodiments, the methods 300 and/or 400 may be embodied as various instructions stored on a computer-readable media, which may be executed by the processor 110, the I/O subsystem 114, and/or other components of the compute device 102 to cause the compute device 102 to perform the respective method 300 and/or 400 respectively. The computer-readable media may be embodied as any type of media capable of being read by the compute device 102 including, but not limited to, the memory 126, the data storage device 128, firmware devices, other memory or data storage devices of the compute device 102, portable media readable by a peripheral device 136 of the compute device 102, and/or other media.

EXAMPLES

Illustrative examples of the technologies disclosed herein are provided below. An embodiment of the technologies may include any one or more, and any combination of, the examples described below.

Example 1 includes a compute device for monitoring health of processes, the compute device comprising one or more hardware counters; a processor; a memory having stored thereon a plurality of instructions that, when executed, causes the compute device to access performance monitoring parameters, wherein each of the performance monitoring parameters is usable to monitor a process of the compute device; sample the one or more hardware counters to generate hardware counter values associated with the monitored process; and perform a process fault check on the monitored process based on the hardware counter values and the performance monitoring parameters.

Example 2 includes the subject matter of Example 1, and wherein the plurality of instructions further causes the compute device to apply a performance monitor filter to the hardware counter values, wherein to perform a process fault check on the monitored process comprises to perform a process fault check on the monitored process based on the filtered hardware counter values and the performance monitoring parameters.

Example 3 includes the subject matter of any of Examples 1 and 2, and wherein to apply the performance monitor filter comprises to apply the performance monitor filter to the sampled one or more hardware counters for at least one of a 5 second window, a 10 second window, a 30 second window, or a 60 second window.

Example 4 includes the subject matter of any of Examples 1-3, and wherein to apply the performance monitor filter comprises to apply an exponentially weighted moving average (EWMA) filter to maintain a running average of the sampled one or more hardware counters.

Example 5 includes the subject matter of any of Examples 1-4, and wherein to access the performance monitoring parameters comprises to retrieve the performance monitoring parameters based on previous measurements on the monitored process from a management system.

Example 6 includes the subject matter of any of Examples 1-5, and wherein the plurality of instructions further causes the compute device to determine the performance monitoring parameters and store the performance monitoring parameters in a performance monitoring parameter storage prior to the access of the performance monitor parameters by the performance monitoring parameter manager.

Example 7 includes the subject matter of any of Examples 1-6, and wherein to determine the performance monitoring parameters comprises to automatically determine values of the performance monitoring parameters through a training period for the monitored process.

Example 8 includes the subject matter of any of Examples 1-7, and wherein to determine the performance monitoring parameters comprises to receive performance monitoring parameters from a user of the compute device.

Example 9 includes the subject matter of any of Examples 1-8, and wherein to determine the performance monitoring parameters comprises to train a machine learning algorithm, wherein the performance monitoring parameters comprise machine learning algorithm parameters.

Example 10 includes the subject matter of any of Examples 1-9, and wherein to perform the process fault check on the monitored process comprises to perform the process fault check using the machine learning algorithm and the machine learning algorithm parameters.

Example 11 includes the subject matter of any of Examples 1-10, and wherein the performance monitoring parameters comprise at least one of a minimum value, a maximum value, or an average value associated with each of the one or more hardware counters.

Example 12 includes the subject matter of any of Examples 1-11, and wherein to sample the one or more hardware counters comprises to sample at least one of one or more Resource Director Technology (RDT) counters or one or more Performance Monitor Unit (PMU) counters associated with the monitored process.

Example 13 includes the subject matter of any of Examples 1-12, and wherein to perform the process fault check comprises to perform at least one of an infinite loop fault check, a negative interplay fault check, or a performance impact check on the monitored process.

Example 14 includes the subject matter of any of Examples 1-13, and wherein the hardware counter values indicate a cache misses/access ratio of the monitored process and uncore activity of the monitored process, wherein to perform the process fault check comprises to perform an infinite loop fault check on the monitored process, wherein to perform the infinite loop fault check comprises to determine whether the cache misses/accesses ratio of the monitored process is out of a first range indicated by the performance monitoring parameters; and determine whether the uncore activity of the monitored process is out of a second range indicated by the performance monitoring parameters.

Example 15 includes the subject matter of any of Examples 1-14, and wherein the hardware counter values indicate a memory bandwidth of the monitored process and cache misses of the monitored process, wherein to perform the process fault check comprises to perform a negative interplay fault check on the monitored process, wherein to perform the negative interplay fault check comprises to perform the negative interplay fault check based on the memory bandwidth of the monitored process and the cache misses of the monitored process.

Example 16 includes the subject matter of any of Examples 1-15, and wherein the hardware counter values indicate an instructions per clock cycle of the monitored process, wherein to perform the process fault check comprises to perform a performance impact check on the monitored process, wherein to perform the performance impact check comprises to determine whether the instructions per clock cycle of the monitored process is out of a range indicated by the performance monitoring parameters.

Example 17 includes the subject matter of any of Examples 1-16, and wherein the plurality of instructions further causes the compute device to generate a report in response to a detection of the process fault based on the hardware counter values and the performance monitoring parameters.

Example 18 includes the subject matter of any of Examples 1-17, and wherein to generate a report in response to the detection of the process fault comprises to generate a report in response to detection of a number of process faults exceeding a threshold number of process faults.

Example 19 includes the subject matter of any of Examples 1-18, and wherein the plurality of instructions further causes the compute device to perform a local corrective action to address the detection of the process fault.

Example 20 includes the subject matter of any of Examples 1-19, and wherein to perform the local corrective action comprises to kill the monitored process and restart the process.

Example 21 includes the subject matter of any of Examples 1-20, and wherein the plurality of instructions further causes the compute device to send the hardware counter values to an analytics system to make a decision on how to address a detected process fault.

Example 22 includes the subject matter of any of Examples 1-21, and wherein the plurality of instructions further causes the compute device to notify a user of the detection of the process fault.

Example 23 includes a method for monitoring health of processes, the method comprising accessing, by a compute device, performance monitoring parameters, wherein each of the performance monitoring parameters is usable to monitor a process of the compute device; sampling, by the compute device, one or more hardware counters of the compute device to generate hardware counter values associated with the monitored process; and performing, by the compute device, a process fault check on the monitored process based on the hardware counter values and the performance monitoring parameters.

Example 24 includes the subject matter of Example 23, and further including applying, by the compute device, a performance monitor filter to the hardware counter values, wherein performing a process fault check on the monitored process comprises performing a process fault check on the monitored process based on the filtered hardware counter values and the performance monitoring parameters.

Example 25 includes the subject matter of any of Examples 23 and 24, and wherein applying the performance monitor filter comprises applying the performance monitor filter to the sampled one or more hardware counters for at least one of a 5 second window, a 10 second window, a 30 second window, or a 60 second window.

Example 26 includes the subject matter of any of Examples 23-25, and wherein applying the performance monitor filter comprises applying an exponentially weighted moving average (EWMA) filter to maintain a running average of the sampled one or more hardware counters.

Example 27 includes the subject matter of any of Examples 23-26, and wherein accessing performance monitoring parameters comprises retrieving performance monitoring parameters based on previous measurements on the monitored process from a management system.

Example 28 includes the subject matter of any of Examples 23-27, and further including determining, by the compute device, performance monitoring parameters and storing the performance monitoring parameters in a performance monitoring parameter storage prior to the accessing of the performance monitoring parameters.

Example 29 includes the subject matter of any of Examples 23-28, and wherein determining the performance monitoring parameters comprises automatically determining values of the performance monitoring parameters through a training period for the monitored process.

Example 30 includes the subject matter of any of Examples 23-29, and wherein determining the performance monitoring parameters comprises receiving performance monitoring parameters from a user of the compute device.

Example 31 includes the subject matter of any of Examples 23-30, and wherein determining the performance monitoring parameters comprises training a machine learning algorithm, wherein the performance monitoring parameters comprise machine learning algorithm parameters.

Example 32 includes the subject matter of any of Examples 23-31, and wherein performing the process fault check on the monitored process comprises performing the process fault check using the machine learning algorithm and the machine learning algorithm parameters.

Example 33 includes the subject matter of any of Examples 23-32, and wherein the performance monitoring parameters comprises at least one of a minimum value, a maximum value, or average values associated with each of the one or more hardware counters.

Example 34 includes the subject matter of any of Examples 23-33, and wherein sampling the one or more hardware counters comprises sampling at least one of one or more Resource Director Technology (RDT) counters or Performance Monitor Unit (PMU) counters associated with the monitored process.

Example 35 includes the subject matter of any of Examples 23-34, and wherein performing the process fault check comprises performing at least one of an infinite loop fault check, a negative interplay fault check, or a performance impact check on the monitored process.

Example 36 includes the subject matter of any of Examples 23-35, and wherein the hardware counter values indicate a cache misses/access ratio of the monitored process and uncore activity of the monitored process, wherein performing the process fault check comprises performing an infinite loop fault check check on the monitored process, wherein performing the infinite loop fault check further comprises determining whether the cache misses/accesses ratio of the monitored process is out of a first range indicated by the performance monitoring parameters and determining whether the uncore activity of the monitored process is out of a second range indicated by the performance monitoring parameters.

Example 37 includes the subject matter of any of Examples 23-36, and wherein the hardware counter values indicate a memory bandwidth of the monitored process and cache misses of the monitored process, wherein performing the process fault check comprises performing a negative interplay fault check on the monitored process, wherein performing the negative interplay fault check comprises performing the negative interplay fault check based on the memory bandwidth of the monitored process and the cache misses of the monitored process.

Example 38 includes the subject matter of any of Examples 23-37, and wherein the hardware counter values indicate an instructions per clock cycle of the monitored process, wherein performing the process fault check comprises performing a performance impact check on the monitored process, wherein performing the performance impact check comprises determining whether the instructions per clock of the monitored process is out of a range indicated by the performance monitoring parameters.

Example 39 includes the subject matter of any of Examples 23-38, and further including generating a report in response to a detection of the process fault based on the hardware counter values and the performance monitoring parameters.

Example 40 includes the subject matter of any of Examples 23-39, and wherein generating a report in response to the detection of the process fault comprises to generate a report in response to detection of a number of process faults exceeding a threshold number of process faults.

Example 41 includes the subject matter of any of Examples 23-40, and further including performing a local corrective action to address the detection of the process fault.

Example 42 includes the subject matter of any of Examples 23-41, and wherein performing the local corrective action comprises killing the monitored process and restarting the process.

Example 43 includes the subject matter of any of Examples 23-42, and further including sending the hardware counter values to an analytics system to make a decision on how to address a detected process fault.

Example 44 includes the subject matter of any of Examples 23-43, and further including notifying a user of the detection of the process fault.

Example 45 includes one or more machine readable storage media comprising a plurality of instructions stored thereon that in response to being executed result in a compute device performing the method of any of Examples 23-44.

Example 46 includes a compute device for monitoring health of processes, the compute device comprising one or more hardware counters; a performance monitoring parameter manager to access performance monitoring parameters, wherein each of the performance monitoring parameters is usable to monitor a process of the compute device; and an analytics engine to sample the one or more hardware counters to generate hardware counter values associated with the monitored process; and perform a process fault check on the monitored process based on the hardware counter values and the performance monitoring parameters.

Example 47 includes the subject matter of Example 46, and wherein the analytics engine is further to apply a performance monitor filter to the hardware counter values, wherein to perform a process fault check on the monitored process comprises to perform a process fault check on the monitored process based on the filtered hardware counter values and the performance monitoring parameters.

Example 48 includes the subject matter of any of Examples 46 and 47, and wherein to apply the performance monitor filter comprises to apply the performance monitor filter to the sampled one or more hardware counters for at least one of a 5 second window, a 10 second window, a 30 second window, or a 60 second window.

Example 49 includes the subject matter of any of Examples 46-48, and wherein to apply the performance monitor filter comprises to apply an exponentially weighted moving average (EWMA) filter to maintain a running average of the sampled one or more hardware counters.

Example 50 includes the subject matter of any of Examples 46-49, and wherein to access the performance monitoring parameters comprises to retrieve the performance monitoring parameters based on previous measurements on the monitored process from a management system.

Example 51 includes the subject matter of any of Examples 46-50, and wherein the performance monitoring parameter manager is further to determine the performance monitoring parameters and store the performance monitoring parameters in a performance monitoring parameter storage prior to the access of the performance monitor parameters by the performance monitoring parameter manager.

Example 52 includes the subject matter of any of Examples 46-51, and wherein to determine the performance monitoring parameters comprises to automatically determine values of the performance monitoring parameters through a training period for the monitored process.

Example 53 includes the subject matter of any of Examples 46-52, and wherein to determine the performance monitoring parameters comprises to receive performance monitoring parameters from a user of the compute device.

Example 54 includes the subject matter of any of Examples 46-53, and wherein to determine the performance monitoring parameters comprises to train a machine learning algorithm, wherein the performance monitoring parameters comprise machine learning algorithm parameters.

Example 55 includes the subject matter of any of Examples 46-54, and wherein to perform the process fault check on the monitored process comprises to perform the process fault check using the machine learning algorithm and the machine learning algorithm parameters.

Example 56 includes the subject matter of any of Examples 46-55, and wherein the performance monitoring parameters comprise at least one of a minimum value, a maximum value, or an average value associated with each of the one or more hardware counters.

Example 57 includes the subject matter of any of Examples 46-56, and wherein to sample the one or more hardware counters comprises to sample at least one of one or more Resource Director Technology (RDT) counters or one or more Performance Monitor Unit (PMU) counters associated with the monitored process.

Example 58 includes the subject matter of any of Examples 46-57, and wherein to perform the process fault check comprises to perform at least one of an infinite loop fault check, a negative interplay fault check, or a performance impact check on the monitored process.

Example 59 includes the subject matter of any of Examples 46-58, and wherein the hardware counter values indicate a cache misses/access ratio of the monitored process and uncore activity of the monitored process, wherein to perform the process fault check comprises to perform an infinite loop fault check on the monitored process, wherein to perform the infinite loop fault check comprises to determine whether the cache misses/accesses ratio of the monitored process is out of a first range indicated by the performance monitoring parameters; and determine whether the uncore activity of the monitored process is out of a second range indicated by the performance monitoring parameters.

Example 60 includes the subject matter of any of Examples 46-59, and wherein the hardware counter values indicate a memory bandwidth of the monitored process and cache misses of the monitored process, wherein to perform the process fault check comprises to perform a negative interplay fault check on the monitored process, wherein to perform the negative interplay fault check comprises to perform the negative interplay fault check based on the memory bandwidth of the monitored process and the cache misses of the monitored process.

Example 61 includes the subject matter of any of Examples 46-60, and wherein the hardware counter values indicate an instructions per clock cycle of the monitored process, wherein to perform the process fault check comprises to perform a performance impact check on the monitored process, wherein to perform the performance impact check comprises to determine whether the instructions per clock cycle of the monitored process is out of a range indicated by the performance monitoring parameters.

Example 62 includes the subject matter of any of Examples 46-61, and further including a fault check reporter to generate a report in response to a detection of the process fault based on the hardware counter values and the performance monitoring parameters.

Example 63 includes the subject matter of any of Examples 46-62, and wherein to generate a report in response to the detection of the process fault comprises to generate a report in response to detection of a number of process faults exceeding a threshold number of process faults.

Example 64 includes the subject matter of any of Examples 46-63, and wherein the fault check reporter is further to perform a local corrective action to address the detection of the process fault.

Example 65 includes the subject matter of any of Examples 46-64, and wherein to perform the local corrective action comprises to kill the monitored process and restart the process.

Example 66 includes the subject matter of any of Examples 46-65, and wherein the fault check reporter is further to send the hardware counter values to an analytics system to make a decision on how to address a detected process fault.

Example 67 includes the subject matter of any of Examples 46-66, and wherein the fault check reporter is further to notify a user of the detection of the process fault.

Example 68 includes a compute device for monitoring health of processes, the compute device comprising circuitry for accessing, by a compute device, performance monitoring parameters, wherein each of the performance monitoring parameters is usable to monitor a process of the compute device; means for sampling one or more hardware counters of the compute device to generate hardware counter values associated with the monitored process; and means for performing a process fault check on the monitored process based on the hardware counter values and the performance monitoring parameters.

Example 69 includes the subject matter of Example 68, and further including means for applying a performance monitor filter to the hardware counter values, wherein the means for performing a process fault check on the monitored process comprises means for performing a process fault check on the monitored process based on the filtered hardware counter values and the performance monitoring parameters.

Example 70 includes the subject matter of any of Examples 68 and 69, and wherein the means for applying the performance monitor filter comprises means for applying the performance monitor filter to the sampled one or more hardware counters for at least one of a 5 second window, a 10 second window, a 30 second window, or a 60 second window.

Example 71 includes the subject matter of any of Examples 68-70, and wherein the means for applying the performance monitor filter comprises means for applying an exponentially weighted moving average (EWMA) filter to maintain a running average of the sampled one or more hardware counters.

Example 72 includes the subject matter of any of Examples 68-71, and wherein the means for accessing performance monitoring parameters comprises means for retrieving performance monitoring parameters based on previous measurements on the monitored process from a management system.

Example 73 includes the subject matter of any of Examples 68-72, and further including means for determining performance monitoring parameters and means for storing the performance monitoring parameters in a performance monitoring parameter storage prior to the accessing of the performance means for monitoring parameters.

Example 74 includes the subject matter of any of Examples 68-73, and wherein the means for determining the performance monitoring parameters comprises means for automatically determining values of the performance monitoring parameters through a training period for the monitored process.

Example 75 includes the subject matter of any of Examples 68-74, and wherein the means for determining the performance monitoring parameters comprises means for receiving performance monitoring parameters from a user of the compute device.

Example 76 includes the subject matter of any of Examples 68-75, and wherein the means for determining the performance monitoring parameters comprises means for training a machine learning algorithm, wherein the performance monitoring parameters comprise machine learning algorithm parameters.

Example 77 includes the subject matter of any of Examples 68-76, and wherein the means for performing the process fault check on the monitored process comprises means for performing the process fault check using the machine learning algorithm and the machine learning algorithm parameters.

Example 78 includes the subject matter of any of Examples 68-77, and wherein the performance monitoring parameters comprises at least one of a minimum value, a maximum value, or average values associated with each of the one or more hardware counters.

Example 79 includes the subject matter of any of Examples 68-78, and wherein the means for sampling the one or more hardware counters comprises means for sampling at least one of one or more Resource Director Technology (RDT) counters or Performance Monitor Unit (PMU) counters associated with the monitored process.

Example 80 includes the subject matter of any of Examples 68-79, and wherein the means for performing the process fault check comprises means for performing at least one of an infinite loop fault check, a negative interplay fault check, or a performance impact check on the monitored process.

Example 81 includes the subject matter of any of Examples 68-80, and wherein the hardware counter values indicate a cache misses/access ratio of the monitored process and uncore activity of the monitored process, wherein the means for performing the process fault check comprises means for performing an infinite loop fault check on the monitored process, wherein the means for performing the infinite loop fault check further comprises means for determining whether the cache misses/accesses ratio of the monitored process is out of a first range indicated by the performance monitoring parameters and means for determining whether the uncore activity of the monitored process is out of a second range indicated by the performance monitoring parameters.

Example 82 includes the subject matter of any of Examples 68-81, and wherein the hardware counter values indicate a memory bandwidth of the monitored process and cache misses of the monitored process, wherein the means for performing the process fault check comprises means for performing a negative interplay fault check on the monitored process, wherein the means for performing the negative interplay fault check comprises means for performing the negative interplay fault check based on the memory bandwidth of the monitored process and the cache misses of the monitored process.

Example 83 includes the subject matter of any of Examples 68-82, and wherein the hardware counter values indicate an instructions per clock cycle of the monitored process, wherein the means for performing the process fault check comprises means for performing a performance impact check on the monitored process, wherein the means for performing the performance impact check comprises means for determining whether the instructions per clock of the monitored process is out of a range indicated by the performance monitoring parameters.

Example 84 includes the subject matter of any of Examples 68-83, and further including means for generating a report in response to a detection of the process fault based on the hardware counter values and the performance monitoring parameters.

Example 85 includes the subject matter of any of Examples 68-84, and wherein the means for generating a report in response to the detection of the process fault comprises to generate a report in response to detection of a number of process faults exceeding a threshold number of process faults.

Example 86 includes the subject matter of any of Examples 68-85, and further including means for performing a local corrective action to address the detection of the process fault.

Example 87 includes the subject matter of any of Examples 68-86, and wherein the means for performing the local corrective action comprises means for killing the monitored process and means for restarting the process.

Example 88 includes the subject matter of any of Examples 68-87, and further including circuitry for sending the hardware counter values to an analytics system to make a decision on how to address a detected process fault.

Example 89 includes the subject matter of any of Examples 68-88, and further including means for notifying a user of the detection of the process fault.

The invention claimed is:

1. A compute device for monitoring health of processes, the compute device comprising:

one or more hardware counters;
a processor;
a memory having stored thereon a plurality of instructions that, when executed, causes the compute device to:
  determine performance monitoring parameters prior to execution of a process of the compute device that is to be monitored, wherein each of the performance monitoring parameters is usable to monitor the process of the compute device and each of the performance monitoring parameters is associated with the particular process to be monitored;
  sample the one or more hardware counters to generate hardware counter values associated with the monitored process, wherein the hardware counter values indicate a cache misses/access ratio of the monitored process and uncore activity of the monitored process; and
  perform a process fault check on the monitored process based on the hardware counter values and the performance monitoring parameters,
  wherein to perform the process fault check comprises to perform an infinite loop fault check on the monitored process, wherein to perform the infinite loop fault check comprises to:
    determine whether the cache misses/accesses ratio of the monitored process is out of a first range indicated by the performance monitoring parameters; and
    determine whether the uncore activity of the monitored process is out of a second range indicated by the performance monitoring parameters.

2. The compute device of claim 1, wherein to determine the performance monitoring parameters comprises to:
  execute the process during a training period;
  sample the one or more hardware counters to generate training hardware counter values associated with the training period of the monitored process, wherein the training hardware counter values are indicative of the normal operation of the monitored process; and
  automatically determine values of the performance monitoring parameters based on the training hardware counter values,
  wherein to perform the process fault check comprises to perform the process fault check during an execution period different from the training period.

3. The compute device of claim 1, wherein the hardware counter values indicate a memory bandwidth of the monitored process and cache misses of the monitored process, wherein to perform the process fault check comprises to perform a negative interplay fault check on the monitored process, wherein to perform the negative interplay fault check comprises to perform the negative interplay fault check based on the memory bandwidth of the monitored process and the cache misses of the monitored process.

4. The compute device of claim 1, wherein the hardware counter values indicate an instructions per clock cycle of the monitored process, wherein to perform the process fault check comprises to perform a performance impact check on the monitored process, wherein to perform the performance impact check comprises to determine whether the instructions per clock cycle of the monitored process is out of a third range indicated by the performance monitoring parameters.

5. The compute device of claim 1, wherein the plurality of instructions further causes the compute device to generate a report in response to a detection of a process fault based on the hardware counter values and the performance monitoring parameters.

6. The compute device of claim 5, wherein to generate a report in response to the detection of the process fault comprises to generate a report in response to detection of a number of process faults exceeding a threshold number of process faults.

7. A method for monitoring health of processes, the method comprising:
  determining, by a compute device, performance monitoring parameters prior to execution of a process of the compute device that is to be monitored, wherein each of the performance monitoring parameters is usable to monitor the process of the compute device and each of the performance monitoring parameters is associated with indicative of a normal operation of the particular process to be monitored;
  sampling, by the compute device, one or more hardware counters of the compute device to generate hardware counter values associated with the monitored process, wherein the hardware counter values indicate a cache misses/access ratio of the monitored process and uncore activity of the monitored process; and
  performing, by the compute device, a process fault check on the monitored process based on the hardware counter values and the performance monitoring parameters,
  wherein performing the process fault check comprises performing an infinite loop fault check on the monitored process, wherein performing the infinite loop fault check further comprises determining whether the cache misses/accesses ratio of the monitored process is out of a first range indicated by the performance monitoring parameters and determining whether the uncore activity of the monitored process is out of a second range indicated by the performance monitoring parameters.

8. The method of claim 7, wherein determining the performance monitoring parameters comprises:
  executing the process during a training period;
  sampling the one or more hardware counters to generate training hardware counter values associated with the training period of the monitored process, wherein the training hardware counter values are indicative of the normal operation of the monitored process; and
  automatically determining values of the performance monitoring parameters based on the training hardware counter values,
  wherein performing the process fault check comprises performing the process fault check during an execution period different from the training period.

9. The method of claim 7, wherein the hardware counter values indicate a memory bandwidth of the monitored process and cache misses of the monitored process, wherein performing the process fault check comprises performing a negative interplay fault check on the monitored process, wherein performing the negative interplay fault check comprises performing the negative interplay fault check based on the memory bandwidth of the monitored process and the cache misses of the monitored process.

10. The method of claim 7, further comprising generating a report in response to a detection of a process fault based on the hardware counter values and the performance monitoring parameters.

11. The method of claim 10, wherein generating a report in response to the detection of the process fault comprises to generate a report in response to detection of a number of process faults exceeding a threshold number of process faults.

12. One or more non-transitory computer-readable media comprising a plurality of instructions stored thereon that, when executed, causes a compute device to:
- determine performance monitoring parameters prior to execution of a process of the compute device that is to be monitored, wherein each of the performance monitoring parameters is usable to monitor the process of the compute device and each of the performance monitoring parameters is associated with indicative of a normal operation of the particular process to be monitored;
- sample one or more hardware counters of the compute device to generate hardware counter values associated with the monitored process, wherein the hardware counter values indicate a cache misses/access ratio of the monitored process and uncore activity of the monitored process; and
- perform a process fault check on the monitored process based on the hardware counter values and the performance monitoring parameters,
- wherein to perform the process fault check comprises to perform an infinite loop fault check on the monitored process, wherein to perform the infinite loop fault check comprises to:
- determine whether the cache misses/accesses ratio of the monitored process is out of a first range indicated by the performance monitoring parameters; and
- determine whether the uncore activity of the monitored process is out of a second range indicated by the performance monitoring parameters.

13. The one or more non-transitory computer-readable media of claim 12, wherein to determine the performance monitoring parameters comprises to automatically determine values of the performance monitoring parameters through a training period for the monitored process.

14. The one or more non-transitory computer-readable media of claim 12, wherein the hardware counter values indicate a memory bandwidth of the monitored process and cache misses of the monitored process, wherein to perform the process fault check comprises to perform a negative interplay fault check on the monitored process, wherein to perform the negative interplay fault check comprises to perform the negative interplay fault check based on the memory bandwidth of the monitored process and the cache misses of the monitored process.

15. The one or more non-transitory computer-readable media of claim 12, wherein the plurality of instructions further causes the compute device to generate a report in response to a detection of a process fault based on the hardware counter values and the performance monitoring parameters.

16. The one or more non-transitory computer-readable media of claim 15, wherein to generate a report in response to the detection of the process fault comprises to generate a report in response to detection of a number of process faults exceeding a threshold number of process faults.

17. A compute device for monitoring health of processes, the compute device comprising:
- circuitry for accessing, by the compute device, performance monitoring parameters, wherein each of the performance monitoring parameters is usable to monitor a process of the compute device;
- means for sampling one or more hardware counters of the compute device to generate hardware counter values associated with the monitored process, wherein the hardware counter values indicate a cache misses/access ratio of the monitored process and uncore activity of the monitored process; and
- means for performing a process fault check on the monitored process based on the hardware counter values and the performance monitoring parameters,
- wherein the means for performing the process fault check comprises means for performing an infinite loop fault check on the monitored process, wherein the means for performing the infinite loop fault check further comprises means for determining whether the cache misses/accesses ratio of the monitored process is out of a first range indicated by the performance monitoring parameters and means for determining whether the uncore activity of the monitored process is out of a second range indicated by the performance monitoring parameters.

18. The compute device of claim 17, wherein the hardware counter values indicate a memory bandwidth of the monitored process and cache misses of the monitored process, wherein the means for performing the process fault check comprises means for performing a negative interplay fault check on the monitored process, wherein the means for performing the negative interplay fault check comprises means for performing the negative interplay fault check based on the memory bandwidth of the monitored process and the cache misses of the monitored process.

19. The method of claim 7, wherein the hardware counter values indicate an instructions per clock cycle of the monitored process, wherein performing the process fault check comprises performing a performance impact check on the monitored process, wherein performing the performance impact check comprises determining whether the instructions per clock cycle of the monitored process is out of a third range indicated by the performance monitoring parameters.

* * * * *